United States Patent
Garner et al.

(10) Patent No.: US 12,140,813 B2
(45) Date of Patent: Nov. 12, 2024

(54) LOW-ATTENUATION ROLLABLE OPTICAL FIBER RIBBON

(71) Applicant: OFS Fitel, LLC, Norcross, GA (US)

(72) Inventors: Harry D Garner, Lawrenceville, GA (US); Kariofilis Konstadinidis, Decatur, GA (US); Heng Ly, Stone Mountain, GA (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 17/770,558

(22) PCT Filed: Nov. 5, 2019

(86) PCT No.: PCT/US2019/059817
§ 371 (c)(1),
(2) Date: Apr. 20, 2022

(87) PCT Pub. No.: WO2021/091536
PCT Pub. Date: May 14, 2021

(65) Prior Publication Data
US 2022/0404571 A1 Dec. 22, 2022

(51) Int. Cl.
*G02B 6/44* (2006.01)
(52) U.S. Cl.
CPC .................. *G02B 6/448* (2013.01)
(58) Field of Classification Search
CPC ..................................................... G02B 6/448
USPC ....................................................... 385/114
See application file for complete search history.

(56) References Cited

U.S. PATENT DOCUMENTS

| | | | |
|---|---|---|---|
| 4,482,204 A * | 11/1984 | Blyler, Jr. | C08F 299/065 65/435 |
| 6,018,605 A | 1/2000 | Mills et al. | |
| 6,759,664 B2 * | 7/2004 | Thompson | C03C 25/12 250/432 R |
| 8,872,137 B2 * | 10/2014 | Childers | F26B 3/28 250/493.1 |
| 9,687,875 B2 * | 6/2017 | Molin | B05D 3/067 |
| 2005/0226573 A1 | 10/2005 | Okuno | |
| 2012/0009358 A1 | 1/2012 | Gharbi | |
| 2013/0092847 A1 * | 4/2013 | Childers | F21K 9/60 250/492.1 |
| 2014/0097361 A1 | 4/2014 | Hartsuiker | |
| 2014/0112631 A1 | 4/2014 | Namazue | |
| 2015/0028020 A1 | 1/2015 | Childers | |

(Continued)

FOREIGN PATENT DOCUMENTS

JP 2003089555 A 3/2003
JP 2010117525 A 5/2010

*Primary Examiner* — Jerry M Blevins
(74) *Attorney, Agent, or Firm* — Smith Tempel Blaha LLC; John H. Harman, Esq.

(57) ABSTRACT

In curing a matrix material of a rollable optical fiber ribbon, ultraviolet light may be concentrated in a selected range of wavelengths to avoid further curing the primary coating of each fiber. A ribbon may be made by aligning the fibers, each having at least a primary coating, into a ribbon shape, applying a matrix material in intermittently distributed portions along the ribbon-shaped group of fibers, and exposing the ribbon-shaped group of fibers and applied matrix material to ultraviolet light concentrated in a range of wavelengths absorbed more by the matrix material than by the primary coating.

18 Claims, 11 Drawing Sheets

(56) References Cited

U.S. PATENT DOCUMENTS

2018/0215661 A1  8/2018  Kouzmina
2019/0049681 A1* 2/2019  Bookbinder ......... G02B 6/4429

* cited by examiner

LOW-ATTENUATION ROLLABLE OPTICAL FIBER RIBBON

BACKGROUND

In optical fiber manufacturing processes, fiber is drawn from a large-diameter glass structure known as a preform. The fiber is drawn through a generally vertical structure known as a draw tower. A furnace or torch may heat a portion of the preform at the top of the draw tower. Molten glass from the preform extends downwardly, forming into a fiber shape. The fiber may pass through a chiller tube filled with inert gas such as helium. The fiber cools and solidifies as it proceeds through the draw tower. A fiber produced in this manner may be wound on a take-up reel for use in subsequent manufacturing processes in which ribbons, cables, etc., may be formed.

One or more coatings may be applied to the fiber. A dual-coated fiber has a primary coating over the bare fiber and a secondary coating over the primary coating. A coating is commonly cured by exposing it to ultraviolet (UV) light that activates a photoinitiator in the coating. In one example of a dual-coating process, commonly referred to as "wet-on-dry," the primary coating is applied and UV-cured in the draw tower, and the secondary coating is then applied over the primary coating and UV-cured in the draw tower. In another example of a dual-coating process, commonly referred to as "wet-on-wet," a primary coating is applied over the bare fiber in the draw tower, a secondary coating is then immediately applied over the primary coating, and both coatings are simultaneously UV-cured in the draw tower. The primary coating may be transparent, and the secondary coating may contain a pigment or colorant. Alternatively, a color coating may be applied over the other coatings in a post-draw tower or "offline" process.

Coating material properties may be carefully selected to help mitigate the undesirable effects of microbending. The primary (inner) coating material commonly has a low modulus of elasticity (also referred to as Young's modulus) to provide a cushioning effect, with low lateral rigidity that may reduce the mechanical perturbations to the fiber axis that produce microbending loss. Because such a low-modulus coating material may easily be damaged during the normal handling associated with fiber and cable manufacturing, the secondary (outer) coating material commonly has a high modulus with high flexural stiffness, to help minimize microbend sensitivity while promoting resistance to damage during the normal handling associated with fiber and cable manufacturing.

To initiate the curing reaction through a photoinitiator, it is generally desirable to maximize the UV absorbance of the photoinitiator(s) of the primary and secondary coatings. The primary and secondary coatings may exhibit maximum UV absorbance in the same wavelength range as each other or in different ranges. For example, although a primary and secondary coating that absorb in the same wavelength range as each other may be used, a primary and secondary coating that absorb in different ranges may instead be used for reasons including, for example, that one coating material may be more economical than the other coating material. For example, a primary coating that absorbs in a 360-410 nm range and a secondary coating that absorbs in a 300-360 nm range may be used. To promote sufficient and expeditious curing of both the primary and secondary coatings, the UV curing lamps employed in a wet-on-wet coating process may be wide-spectrum mercury arc or microwave lamps. It is also known to use UV light-emitting diodes (LEDs) for certain coating curing processes.

SUMMARY

Embodiments of the invention relate to methods and systems for making a rollable optical fiber ribbon. In curing a matrix material of the rollable optical fiber ribbon, UV light may be concentrated in a selected range of wavelengths to avoid further curing the primary coating material of the individual fibers.

An exemplary optical fiber ribbon may include a ribbon-shaped group of optical fibers and a matrix material. The ribbon-shaped group of optical fibers may comprise a plurality of optical fibers aligned parallel to and adjacent each other. Each optical fiber may have a UV-curable primary coating with an in-situ Young's modulus less than 0.5 megapascal (MPa). The UV-curable matrix material may be distributed intermittently in portions between and in contact with each pair of adjacent fibers along the ribbon-shaped group of fibers.

An exemplary method for making an optical fiber ribbon may include aligning a plurality of optical fibers parallel to and adjacent to each other to form a ribbon-shaped group of fibers, each of which has at least a primary coating. The method may further include applying a matrix material in intermittently distributed portions between and in contact with each pair of adjacent fibers along the ribbon-shaped group of fibers. The method may still further include exposing the ribbon-shaped group of fibers and applied matrix material to ultraviolet (UV) light concentrated in a range of wavelengths absorbed more by the matrix material than by the primary coating.

An exemplary system for making an optical fiber ribbon may include a fiber aligner, a matrix applicator, a tube, and at least one narrow-band UV light-source. The fiber aligner is configured to align a plurality of optical fibers parallel to and adjacent each other to form a ribbon-shaped group of fibers, each of which has at least a primary coating. The matrix applicator is configured to apply a matrix material in intermittently distributed portions between and in contact with each pair of adjacent fibers along the ribbon-shaped group of fibers. The tube encloses the ribbon-shaped group of fibers and applied matrix material. The narrow-band UV light source is oriented toward the tube enclosing the ribbon-shaped group of fibers and applied matrix material. The narrow-band UV light source is configured to emit UV light concentrated in a second range of wavelengths absorbed more by the matrix material than by the primary coating and not in a first range of wavelengths absorbed more by the primary coating than by the matrix material.

Other systems, methods, features, and advantages will be or become apparent to one of skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

An optical fiber ribbon comprises two or more parallel optical fibers that are joined together along their lengths. A material commonly referred to as a matrix adheres the fibers together. In a "flat" (also referred to as "encapsulated") type of optical fiber ribbon, the fibers may be fully encapsulated within the matrix material. The rigidity of encapsulated optical fiber ribbons presents challenges to achieving high fiber packing density in cables. So-called "rollable" optical fiber ribbons have been developed to achieve high fiber packing density in cables. In a rollable ribbon the matrix material is intermittently distributed along the fibers (e.g., in patches), providing sufficient flexibility to roll up the ribbon about an axis parallel to the fibers or otherwise compact the ribbon into a fiber bundle with a roughly cylindrical shape. The term "rollable ribbon" is used in this disclosure to mean optical fiber ribbon in which the matrix material is intermittently distributed along the fibers.

In manufacturing rollable ribbons, UV light is used to cure the matrix material that has been intermittently distributed along the fibers to adhere them together. This additional curing step may not only cure the matrix material but also further cure the primary coating of each individual fiber, resulting in an increase in modulus of elasticity of the primary coating. The increased modulus of the primary coating makes the fiber more sensitive to microbend losses. The increased modulus of the primary coating resulting from further curing (i.e., over-curing) is believed to explain why rollable ribbon commonly has greater signal attenuation than flat ribbon. Although the matrix material is similarly cured in manufacturing flat ribbon, such curing generally does not over-cure the primary coating because in flat ribbon the relatively large amount of matrix material encapsulating the fibers absorbs most of the UV light. Methods and systems are described below that address this problem and enable rollable ribbons having lower attenuation than conventional rollable ribbons to be manufactured.

Figure 1:
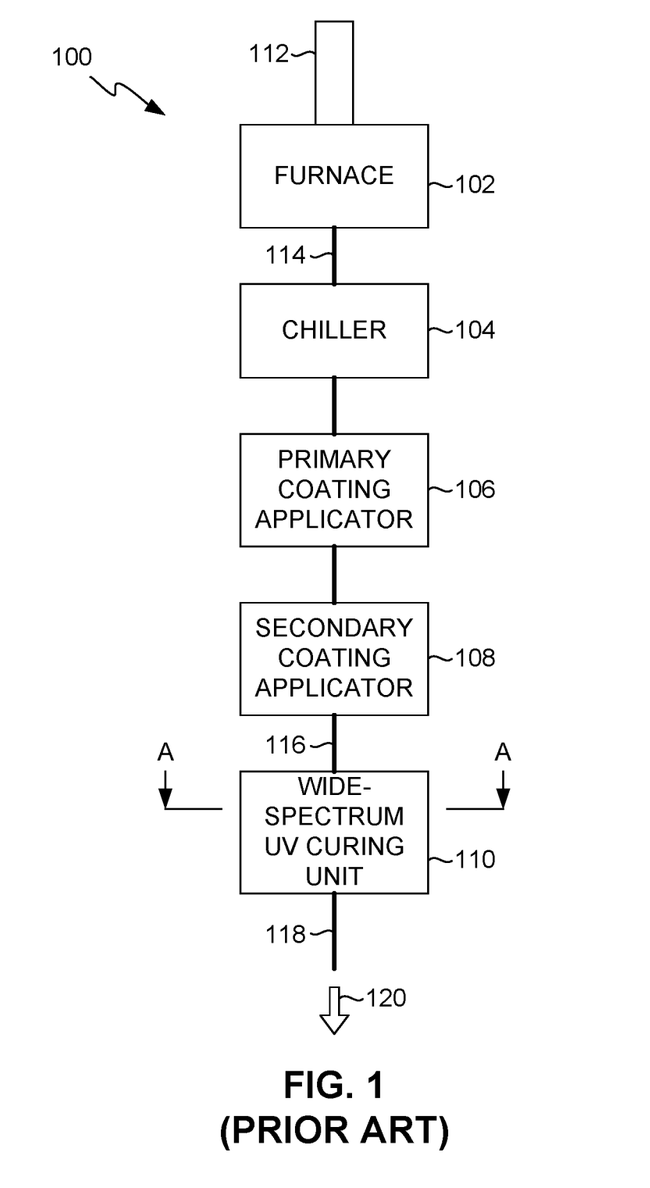
FIG. 1 is a diagrammatic illustration of a conventional draw tower.

As illustrated in FIG. 1, a conventional optical fiber draw tower 100 may include a draw furnace 102, a chiller 104, a primary coating applicator 106, a secondary coating applicator 108, and a wide-spectrum ultraviolet (UV) curing unit 110. A glass preform 112 is provided at the input or top of draw tower 100. As draw tower 100 is oriented vertically, and the fiber draw process proceeds from top to bottom within draw tower 100, an element beneath another element in draw tower 100 may be referred to for convenience as following the other element. At the top of draw tower 100, draw furnace 102 heats a portion of glass preform 112, and the molten glass is directed downwardly to form a fiber 114. Chiller 104 aids cooling of fiber 114. Primary coating applicator 106 applies a liquid primary coating on fiber 114. Then, secondary coating applicator 108 applies a liquid secondary coating directly over the liquid primary coating in a so-called "wet-on-wet" coating process. (Alternatively, another wide-spectrum UV curing unit could be included between primary coating applicator 106 and secondary coating applicator 108 in a "wet-on-dry" process.) The fiber 116 then proceeds through UV curing unit 110, which exposes the fiber 116 to wide-spectrum UV radiation, thus curing both the primary and secondary coatings in the wet-on-wet process.

The primary and secondary coatings each contain a photoinitiator that initiates UV curing by breaking down into free radicals when exposed to UV radiation of a certain range. The primary coating contains a first photoinitiator that absorbs UV light in a first range (to a greater extent than in a second range), and the secondary coating contains a second photoinitiator that absorbs UV light in a second range (to a greater extent than the first range). Each of the first and second photoinitiators exhibits maximum UV absorbance in a relatively narrow wavelength range compared with the wavelength range emitted by wide-spectrum UV curing unit 110. Although the first and second wavelength ranges may have any values within the UV spectrum, in one example the first range is 360-410 nm, and the second range is 300-360 nm. Curing unit 110 emits light over a spectrum encompassing both the first and second wavelength ranges. In an example in which the primary coating absorbs UV light in a 360-410 nm range, and the secondary coating absorbs UV light in a 300-360 nm range, this exposure to wide-spectrum light, i.e., spanning both the first and second ranges, at least partially cures both the primary and secondary coatings. (Additional curing may occur if the fiber is later exposed to UV light, such as during production of a ribbon.) The dual-coated, cured fiber 118 exits draw tower 100 in a downward direction 120 and then may be redirected and wound on a take-up reel (not shown) for further processing as described below.

Figure 2:
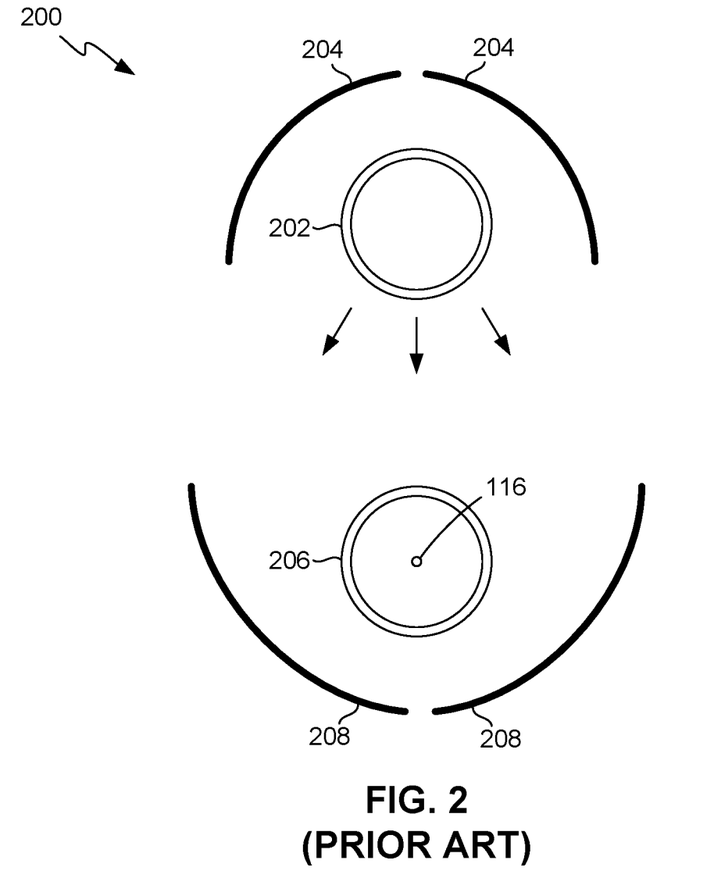
FIG. 2 is a cross-sectional view of a portion of the draw tower of FIG. 1.

A conventional wide-spectrum curing unit 200 is illustrated in cross section in FIG. 2. Wide-spectrum curing unit 200 may be an example of wide-spectrum curing unit 110 (FIG. 1, with the cross sectional view taken on line A-A). Wide-spectrum curing unit 200 may include a tubular UV bulb 202, a pair of curved primary reflectors 204, a quartz tube 206 parallel to the UV bulb 202, and a pair of curved secondary reflectors 208. The pair of curved primary reflectors 204 together form a generally trough-shaped (e.g., parabolic) reflector unit, with the UV bulb 202 generally at its focal point. Similarly, the pair of curved secondary reflectors 208 together form a generally trough-shaped (e.g., parabolic) reflector unit, with the center of quartz tube 206 generally at its focal point. In a generally continuous process, the dual-coated fiber 116 enters the top of wide-spectrum curing unit 200, extends through quartz tube 206, and emerges at the bottom of wide-spectrum coating curing unit 200 in the form of the above-referenced dual-coated, cured fiber 118 (FIG. 1).

Figure 3:
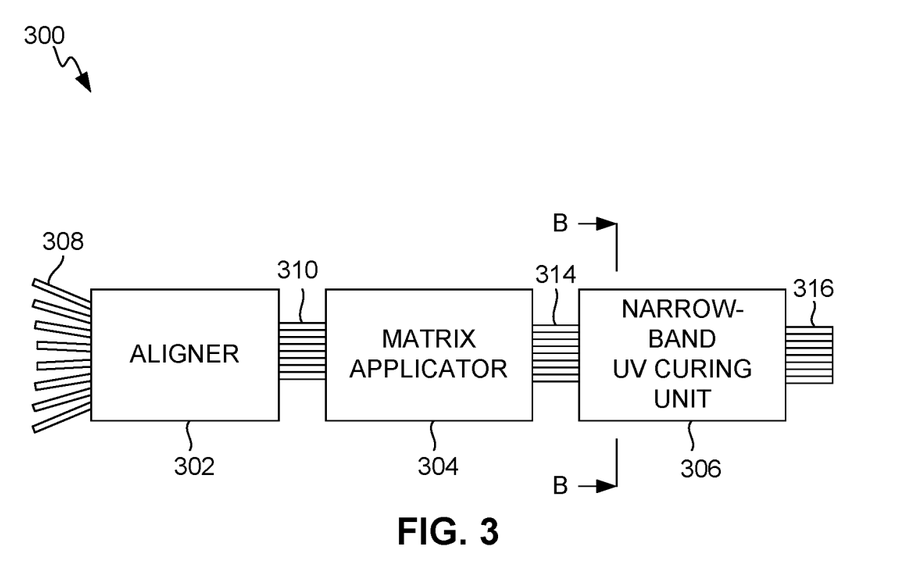
FIG. 3 is a diagrammatic illustration of a system for making a rollable optical fiber ribbon, in accordance with exemplary embodiments.

As illustrated in FIG. 3, a system 300 for manufacturing rollable ribbon in accordance with the present disclosure may include an aligner 302, a matrix applicator 304, and a narrow-band UV curing unit 306. In a generally continuous process, two or more individual fibers 308 may be fed into the aligner 302, which aligns them parallel to and adjacent each other to form a ribbon-shaped fiber structure 310. Although the internal structure of aligner 302 is not shown in FIG. 3 for purposes of clarity, the structure is well known to one of ordinary skill and may include a plurality of converging grooves that receive and guide the individual fibers 308. A portion of the above-referenced dual-coated, cured fiber 118 (FIG. 1) may be an example of each individual fiber 308. Although in the example shown in FIG. 3 there are eight fibers 308, a rollable ribbon in accordance with the present disclosure may have any number of fibers.

Figure 4:
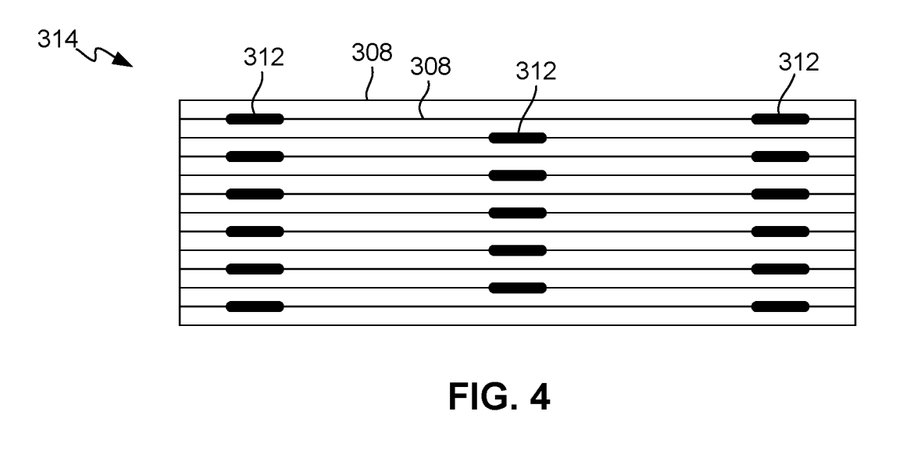
FIG. 4 is a top plan view of a portion of rollable optical fiber ribbon, in accordance with exemplary embodiments.

Matrix applicator 304 applies matrix material to ribbon-shaped fiber structure 310. As illustrated in FIG. 4, the matrix material is applied in intermittently distributed portions 312 between and in contact with each pair of adjacent fibers 308 along ribbon-shaped fiber structure 310 to form a fiber structure 314 that enters narrow-band UV curing unit 306. As understood by one of ordinary skill in the art, the intermittently distributed portions of matrix material that characterize a rollable ribbon may form any pattern; the pattern indicated in FIG. 4 is intended only as an example.

Like the primary and secondary coatings, the matrix material contains a photoinitiator that initiates UV curing. The photoinitiator may exhibit maximum UV absorbance in, for example, the second wavelength range (and not in the first wavelength range). That is, the matrix material may, for example, absorb light in the same wavelength range as the secondary coating.

As described in further detail below, narrow-band UV curing unit 306 emits UV light in a narrower wavelength band or range than the above-described wide-spectrum curing unit 110 (FIG. 1). The wavelength band is concentrated in a band or range of wavelengths absorbed more by the matrix material than by the primary coating.

Figure 11:
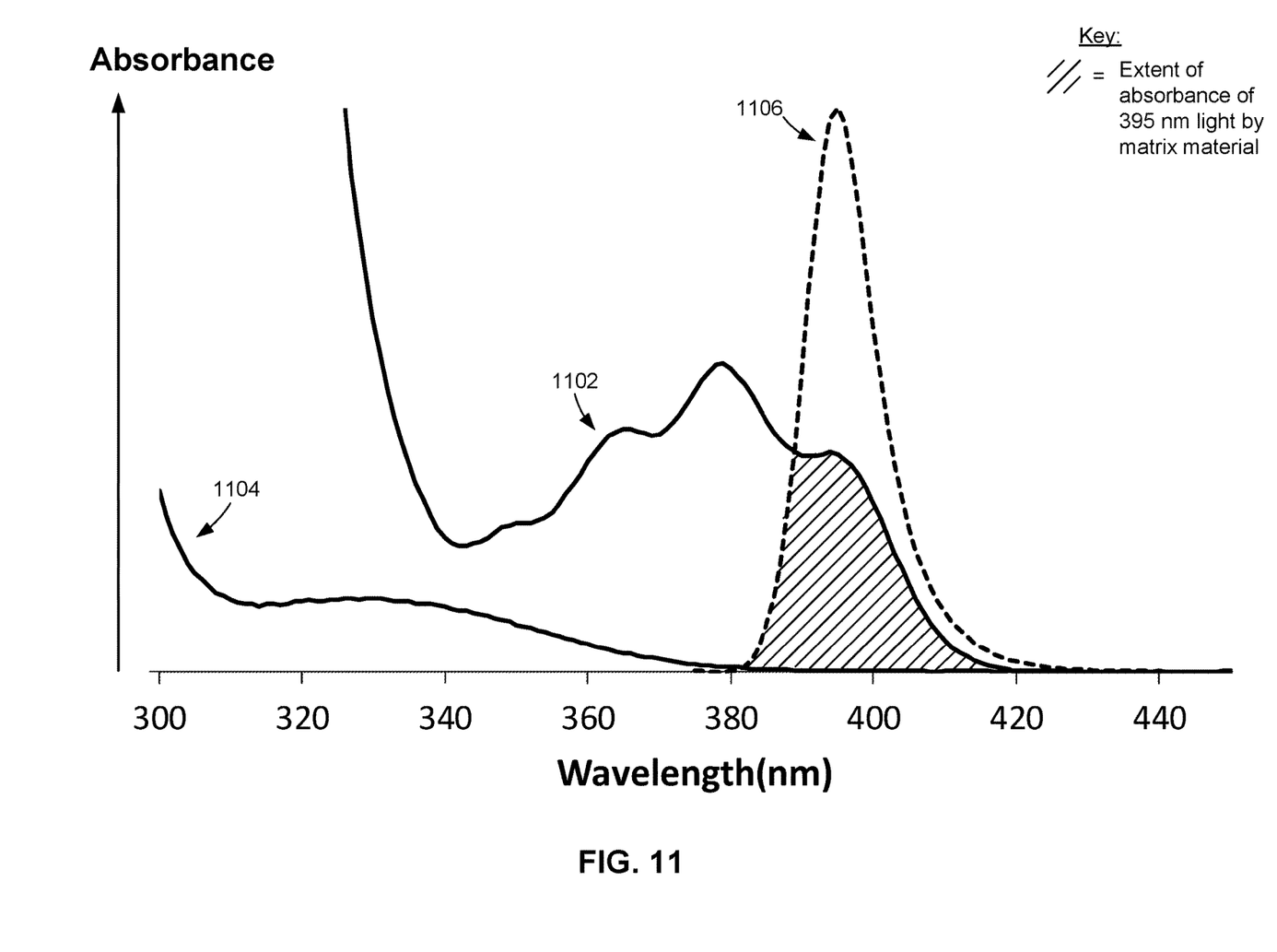
FIG. 11 is an example of a plot of matrix material and primary coating absorbance over a wavelength range.

As illustrated in FIG. 11, an example of matrix material absorbance 1102 and an example of primary coating absorbance 1104 are plotted with respect to an example of UV light emission 1106 in a range concentrated around 395 nm. The matrix material absorbance 1102 may be characteristic of a matrix material containing a photoinitiator exhibiting maximum absorbance in a range, commonly referred to as "Range B," of about 360-410 nm. A commercially available example of a Range B photoinitiator is LUCIRIN TPO®. The primary coating absorbance 1104 may be characteristic of a primary coating containing a photoinitiator exhibiting maximum absorbance in a range, commonly referred to as "Range A," of about 300-360 nm. A commercially available example of a Range A photoinitiator is IRGACURE 184®. The term "maximum absorbance" does not necessarily refer to a peak but rather to the area under the curve, within the UV spectrum of commonly available UV curing units (e.g., about 300-450 nm).

In the example shown in FIG. 11, in which the primary coating absorbs UV light in Range A (300-360 nm) and the matrix material absorbs UV light in Range B (360-410 nm), the range of wavelengths emitted by narrow-band UV curing unit 306 (FIG. 3) may be concentrated in Range B (360-410 nm) and not in Range A (300-360 nm). Note in FIG. 11 that the overlap area (shown in cross-hatching for emphasis) between the light emission 1106 and the matrix material absorbance 1102 (i.e., the area defined by the intersection of the areas under the two curves) is much greater than the area of overlap between the light emission 1106 and the primary coating absorbance 1104. Indeed, as the primary coating absorbance is near zero above about 380 nm, the area of overlaps between the light emission 1106 and the primary coating absorbance 1104 in this example is near zero. The overlap area between the light emission 1106 and the matrix material absorbance 1102 may be at least 4 times the area of overlap between the light emission 1106 and the primary coating absorbance 1104. More generally, the intersection or overlap of the area under a curve representing the absorbance of a photoinitiator and the area under a curve representing the emitted light defines the extent of absorption of that light by that photoinitiator. By comparing absorbance curves for two different photoinitiators it can be determined whether light of a certain wavelength (or narrow wavelength band) is absorbed more by one photoinitiator than the other.

In the example illustrated in FIG. 11, in which the UV light emitted by narrow-band curing unit 306 is absorbed at least 4 times more by the matrix material than by the primary coating, the UV light emitted by narrow-band curing unit 306 cures the matrix material but does not substantially further cure the primary coating material of the individual fibers 308, which would increase the modulus of elasticity of the primary coating and attendant sensitivity of the fiber 308 to microbend losses. The rollable ribbon 316 produced by the system 300 therefore may advantageously have lower attenuation than conventional rollable ribbon having matrix material cured by wide-spectrum light.

Figure 12:
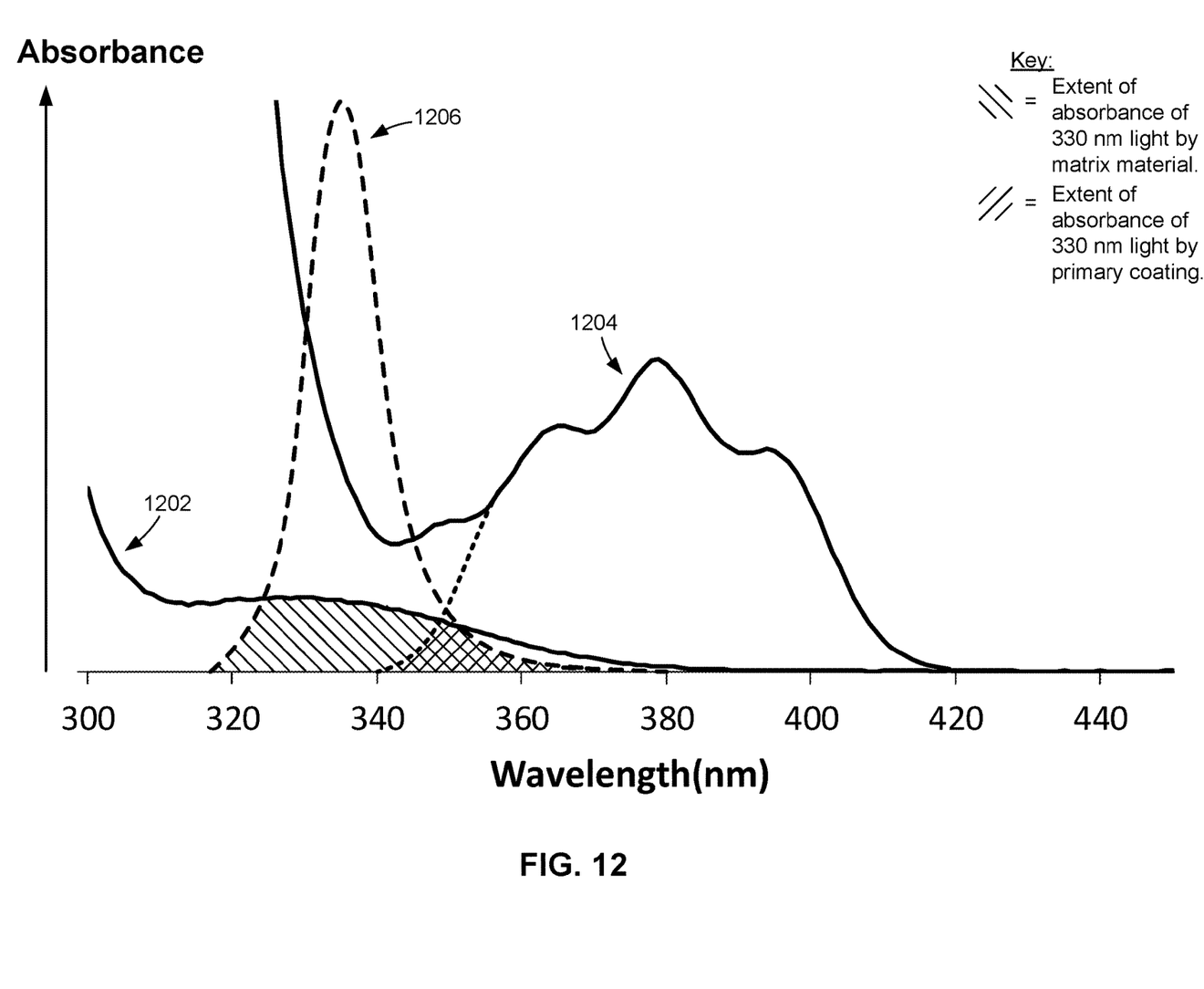
FIG. 12 is another example of a plot of matrix material and primary coating absorbance over a wavelength range.

As illustrated in FIG. 12, another example of matrix material absorbance 1202 and another example of primary coating absorbance 1204 are plotted with respect to an example of UV light emission 1206 in a range concentrated around 330 nm. The matrix material absorbance 1202 may be characteristic of a matrix material containing a photoinitiator exhibiting maximum absorbance in Range A, and the primary coating absorbance 1204 may be characteristic of a matrix material containing a photoinitiator exhibiting maximum absorbance in Range B. In the example illustrated in FIG. 12, the overlap area between the light emission 1206 and the matrix material absorbance 1202 (i.e., the intersection of the areas under the two curves) is greater than the area of overlap between the light emission 1206 and the primary coating absorbance 1204. For example, the overlap area between the light emission 1206 and the matrix material absorbance 1202 may be 4 times or more the area of overlap between the light emission 1206 and the primary coating absorbance 1204. As would be understood by one of ordinary skill in the art, the steep slope exhibited by the primary coating absorbance 1204 below about 340 nm is due to the bulk coating absorption and not due to the photoinitiator, and therefore does not contribute to curing despite the large area of overlap between the light emission 1206 and the primary coating absorbance 1204 below about 340 nm. The coatings are effectively opaque below a certain wavelength. The cutoff between the primary coating absorbance 1204 that is due to the photoinitiator and the primary coating absorbance 1204 that is due to the bulk coating absorption is shown in broken line in FIG. 12 for purposes of clarity.

The Young's modulus of the primary coating of each optical fiber 308 of a rollable ribbon 316 (FIG. 3) produced using methods and systems in accordance with the present disclosure may be less than 0.5 megapascal (MPa). The following method may be used to determine the Young's modulus of the primary coating of an optical fiber 308 of a rollable ribbon 316. A Young's modulus measurement of the primary coating on an optical fiber 308 obtained from a rollable ribbon 316 may be referred to as an in-situ modulus (ISM) measurement. The principles for determining ISM of a fiber primary coating are well known, and the following method is intended as only one example of how such principles may be applied.

The ISM of the primary coating of a fiber may be determined by gluing a 1 cm section of one end of the fiber onto an immobile substrate using a 2-part epoxy, waiting about one hour for the epoxy to fully cure, attaching a weight on the free end of the fiber, and measuring the fiber displacement using an optical microscope. Five measurements with weights ranging from 10 to 70 grams may be made and repeated (e.g., twice) on each sample. As well understood in the art (and ignoring the contribution of glass stretching), the shear modulus is given by $G=(s/2\pi l)*\ln(R_2/R_1)$, where $R_2$ and $R_1$ are the outside and inside radii of the primary, l is the gage length, and s is the regression slope of the force vs. displacement curve. A rubbery Poisson's ratio of 1/2 may be assumed, and the tensile modulus E (i.e. in-situ modulus) maybe reported as 3 times the shear modulus G. For measurement of ISM of a fiber in a rollable ribbon, the fibers may be peeled off the ribbon, and a 1 cm section of fiber substantially free of matrix may be embedded into the epoxy (thus forming the gage length). A statistically significant number of 1cm sections (e.g., 12 or more sections) of the fiber may be measured in the above-described manner, and the median of the measurements will be less than 0.5 MPa for a rollable ribbon produced using methods and systems in accordance with the present disclosure.

Figure 5:
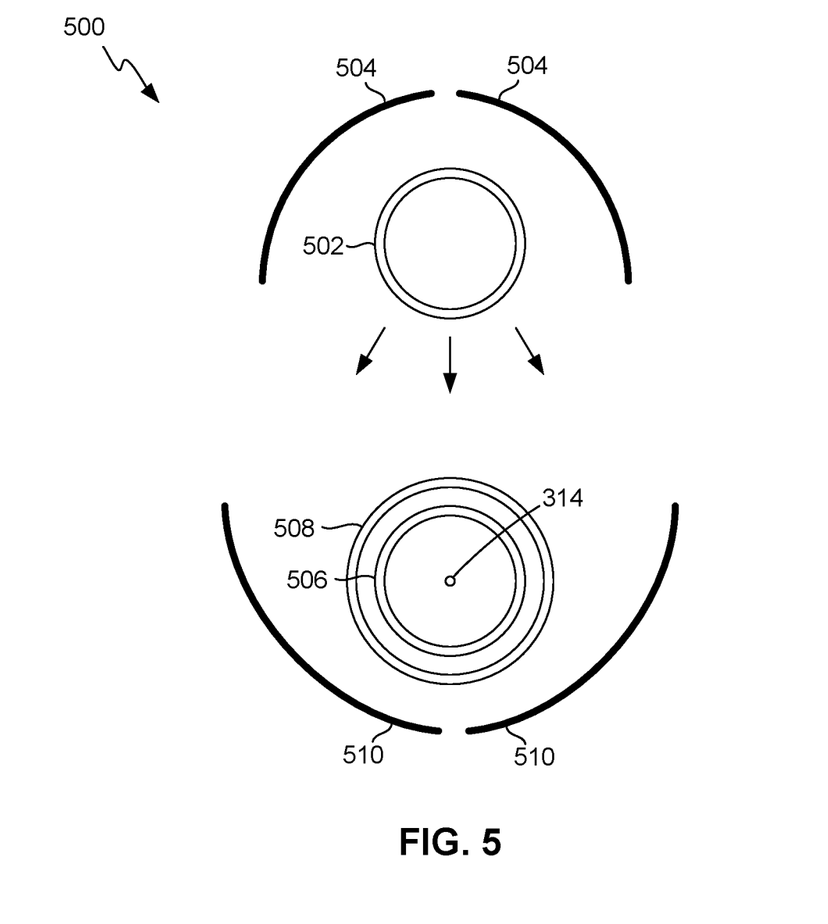
FIG. 5 is a cross-sectional view of a portion of a narrow-band curing lamp unit, in accordance with exemplary embodiments.

A narrow-band UV curing unit 500 is illustrated in cross section in FIG. 5. Narrow-band UV curing unit 500 may be an example of narrow-band UV curing unit 306 (FIG. 3, with the cross sectional view taken on line B-B). Narrow-band UV curing unit 500 may include a tubular UV bulb 502, a pair of curved primary reflectors 504, a quartz tube 506, a tubular bandpass filter 508, and a pair of curved secondary reflectors 510. Quartz tube 506 is positioned concentrically within tubular bandpass filter 508 and parallel to tubular UV bulb 502. The pair of curved primary reflectors 504 together form a generally trough-shaped (e.g., parabolic) reflector unit, with the UV bulb 502 generally at its focal point. Similarly, the pair of curved secondary reflectors 510 together form a generally trough-shaped (e.g., parabolic) reflector unit, with the center of quartz tube 506 generally at its focal point. The UV bulb 502 may emit UV light over a wide spectrum, such as over a spectrum encompassing both the first range (e.g., 360-410 nm), in which the primary coating absorbs substantially more UV light than the matrix material, and the second range (e.g., 300-360 nm), over which the matrix material absorbs substantially more UV light than the primary coating.

Tubular bandpass filter 508 has a passband centered on approximately a wavelength at which the matrix material exhibits maximum UV absorbance (e.g., a wavelength in the 300-360 nm range) and at which the primary coating exhibits a substantially lower UV absorbance than its own maximum UV absorbance. Quartz tube 506 is substantially transparent to the entire spectrum of light emitted by UV bulb 502. That is, quartz tube 506 is substantially transparent to light encompassing both the first range (e.g., 360-410 nm), in which the primary coating absorbs substantially more UV light than the matrix material, and the second range (e.g., 300-360 nm), over which the matrix material absorbs substantially more UV light than the primary coating.

In a generally continuous process, the above-described fiber structure 314 (FIG. 3) enters one end of narrow-band UV curing unit 500, extends through the quartz tube 506, and emerges at the other end of narrow-band UV curing unit 500 in the form of the above-referenced rollable ribbon 316 (FIG. 3). The pair of curved primary reflectors 504 directs the UV light emitted by UV bulb 502 toward the quartz tube 506, tubular bandpass filter 508, and pair of curved secondary reflectors 510. The pair of curved secondary reflectors 510 further focuses the UV light upon fiber structure 314 within quartz tube 506 and tubular bandpass filter 508. As fiber structure 314 moves through narrow-band UV curing unit 500, tubular bandpass filter 508 filters the UV light emitted by UV bulb 502, and thus the light impinging upon fiber structure 314 may be concentrated in the second range (e.g., 300-360 nm) and not in the first range (e.g., 360-410 nm). As a result, the UV light emitted by narrow-band UV curing unit 500 cures the matrix material but does not substantially further cure the primary coating.

Figure 6:
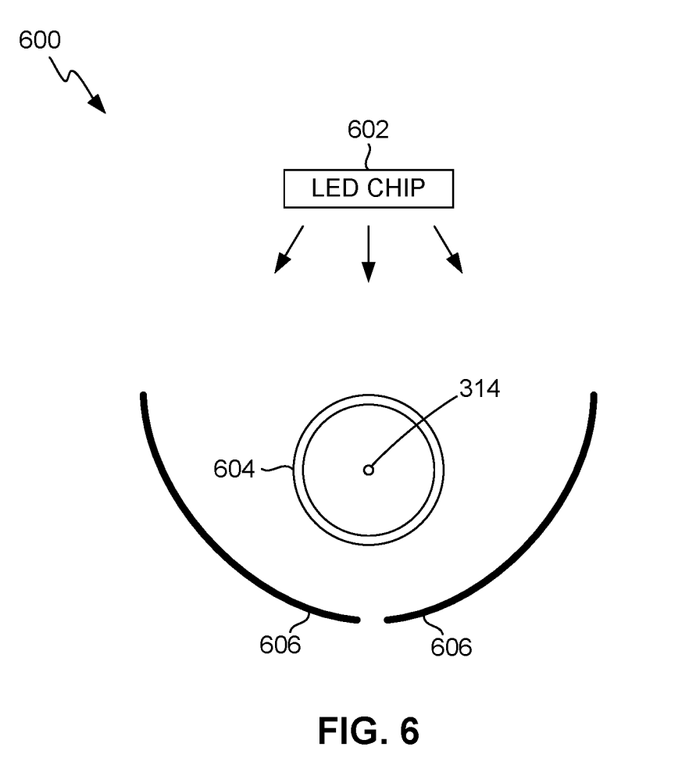
FIG. 6 is a cross-sectional view of a portion of another narrow-band curing lamp unit, in accordance with exemplary embodiments.

Another narrow-band UV curing unit 600 is illustrated in cross section in FIG. 6. Narrow-band UV curing unit 600 may be an example of narrow-band UV curing unit 306 (FIG. 3, with the cross sectional view taken on line B-B). Narrow-band UV curing unit 600 may include a UV LED (chip) 602, a quartz tube 604, and a pair of curved reflectors 606. Quartz tube 604 is positioned opposite the emitting face of UV LED 602. The pair of curved reflectors 606 together form a generally trough-shaped (e.g., parabolic) reflector unit, with the center of quartz tube 604 generally at its focal point.

In a generally continuous process, the above-described fiber structure 314 (FIG. 3) enters one end of narrow-band UV curing unit 600, extends through the quartz tube 604, and emerges at the other end of narrow-band UV curing unit 600 in the form of the above-referenced rollable ribbon 316 (FIG. 3). The UV LED 602 emits light concentrated in a range centered on approximately a wavelength at which the matrix material exhibits its maximum absorbance (e.g., a wavelength in in the 300-360 nm range) and at which the primary coating exhibits a substantially lower absorbance than its own maximum absorbance. Quartz tube 604 may be substantially transparent to the light emitted by UV LED 602 (e.g., 300-360 nm). The pair of curved reflectors 606 focuses the UV light emitted by UV LED 602 upon fiber structure 314 within quartz tube 604. As fiber structure 314 moves through narrow-band UV curing unit 600, the light emitted by UV LED 602, and thus the light impinging upon fiber structure 314 may be concentrated in the second range (e.g., 300-360 nm) and not in the first range (e.g., 360-410 nm). As a result, the UV light emitted by narrow-band curing unit 600 cures the matrix material but does not substantially further cure the primary coating.

Figure 7:
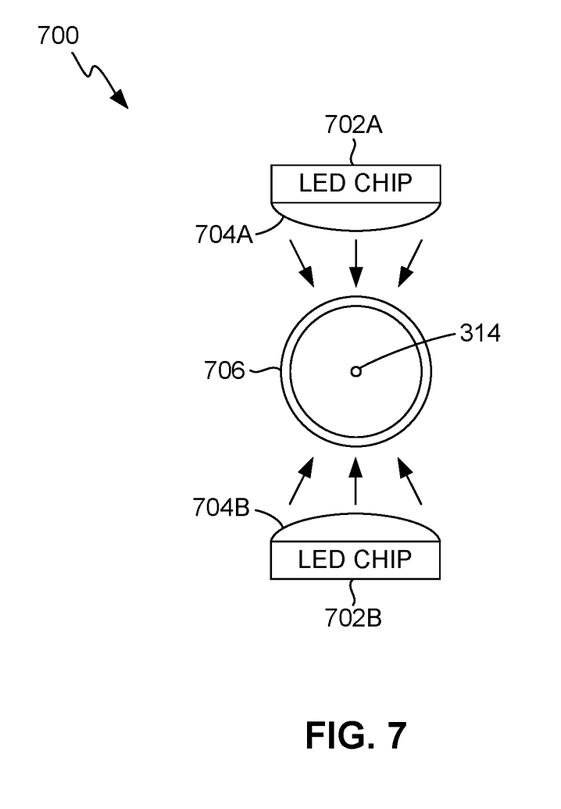
FIG. 7 is a cross-sectional view of a portion of yet another narrow-band curing lamp unit, in accordance with exemplary embodiments.

Yet another narrow-band UV curing unit 700 is illustrated in cross section in FIG. 7. Narrow-band UV curing unit 700 may be an example of narrow-band UV curing unit 306 (FIG. 3, with the cross sectional view taken on line B-B). Narrow-band UV curing unit 700 may include one or more UV LEDs (chips) 702A, 702B, etc., associated focusing lenses 704A, 704B, etc., and a quartz tube 706. Quartz tube 706 is positioned opposite or between the emitting faces of UV LEDs 702A, 702B, etc., with focusing lenses 704A, 704B, etc., between the associated ones of UV LEDs 702A, 702B, etc., and quartz tube 706. The center of quartz tube 706 is generally at the focal point of each of lenses 704A, 704B, etc.

In a generally continuous process, the above-described fiber structure 314 (FIG. 3) enters one end of narrow-band UV curing unit 700, extends through the quartz tube 706, and emerges at the other end of narrow-band UV curing unit 700 in the form of the above-referenced rollable ribbon 316 (FIG. 3). The UV LEDs 702A, 702B, etc., emit light concentrated in a range centered on approximately a wavelength at which the matrix material exhibits its maximum absorbance (e.g., a wavelength in the in the 300-360 nm range) and at which the primary coating exhibits a substantially lower absorbance than its own maximum absorbance. Quartz tube 706 may be substantially transparent to the light emitted by UV LEDs 702A, 702B, etc. (e.g., 300-360 nm). Focusing lenses 704A, 704B, etc., focus the UV light emitted by the associated UV LEDs 702A, 702B, etc., upon fiber structure 314 within quartz tube 706. As fiber structure 314 moves through narrow-band UV curing unit 700, the light emitted by UV LEDs 702A, 702B, etc., and thus the light impinging upon fiber structure 314 may be concentrated in the second range (e.g., 300-360 nm) and not in the first range (e.g., 360-410 nm). As a result, the UV light emitted by narrow-band curing unit 700 cures the matrix material but does not substantially further cure the primary coating.

Figure 8:
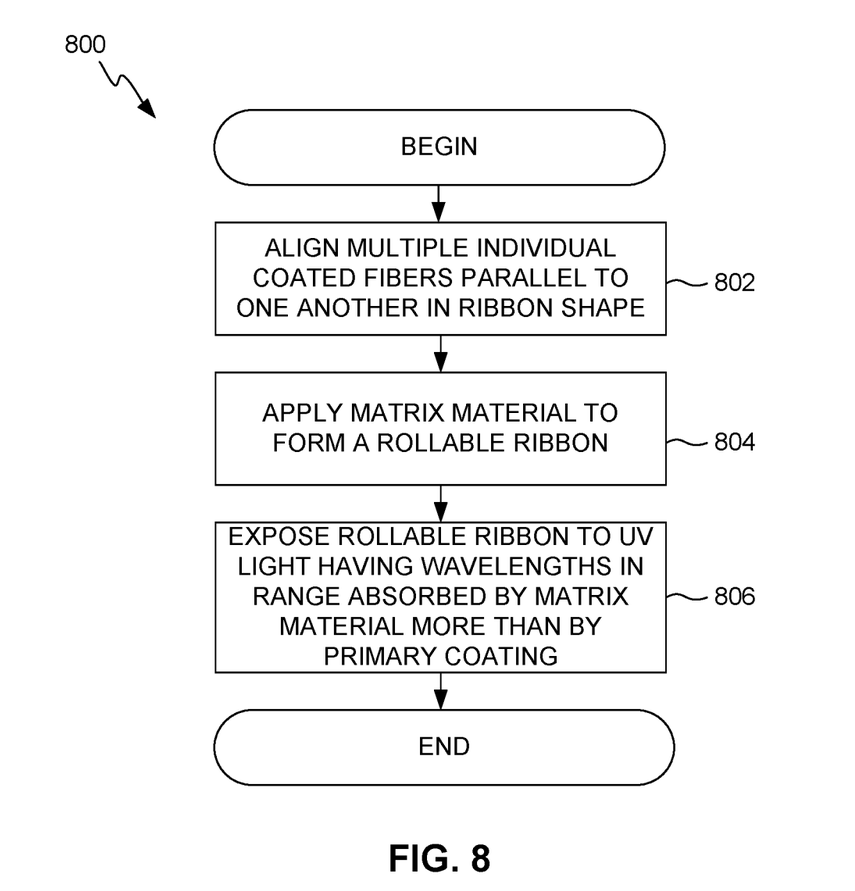
FIG. 8 is a flow diagram illustrating a method for making a rollable optical fiber ribbon, in accordance with exemplary embodiments.

A method 800 for making an optical fiber ribbon is illustrated in flow diagram form in FIG. 8. As indicated by block 802 (and with further reference to FIGS. 3-4), a plurality of optical fibers 308 (FIG. 3) are aligned parallel to and adjacent each other to form a ribbon-shaped fiber structure 310 (FIG. 3). Each optical fiber has a primary coating. Each optical fiber may additionally have a secondary coating over the primary coating. As indicated by block 804, a matrix material is then applied in intermittently distributed portions 312 (FIG. 4) between and in contact with each pair of adjacent fibers 308 along the ribbon-shaped fiber structure 310. As indicated by block 806, the resulting fiber structure 314 (FIG. 3) with applied matrix material is exposed to UV light concentrated in a range of wavelengths absorbed more by the matrix material than by the primary coating. The light to which fiber structure 314 is exposed may be produced by, for example, a UV LED having a wavelength range selected and provided in the manner described above with regard to FIGS. 6-7, or alternatively, a UV bulb in combination with an optical bandpass filter having a wavelength range selected and provided in the manner described above with regard to FIG. 5.

Figure 9:
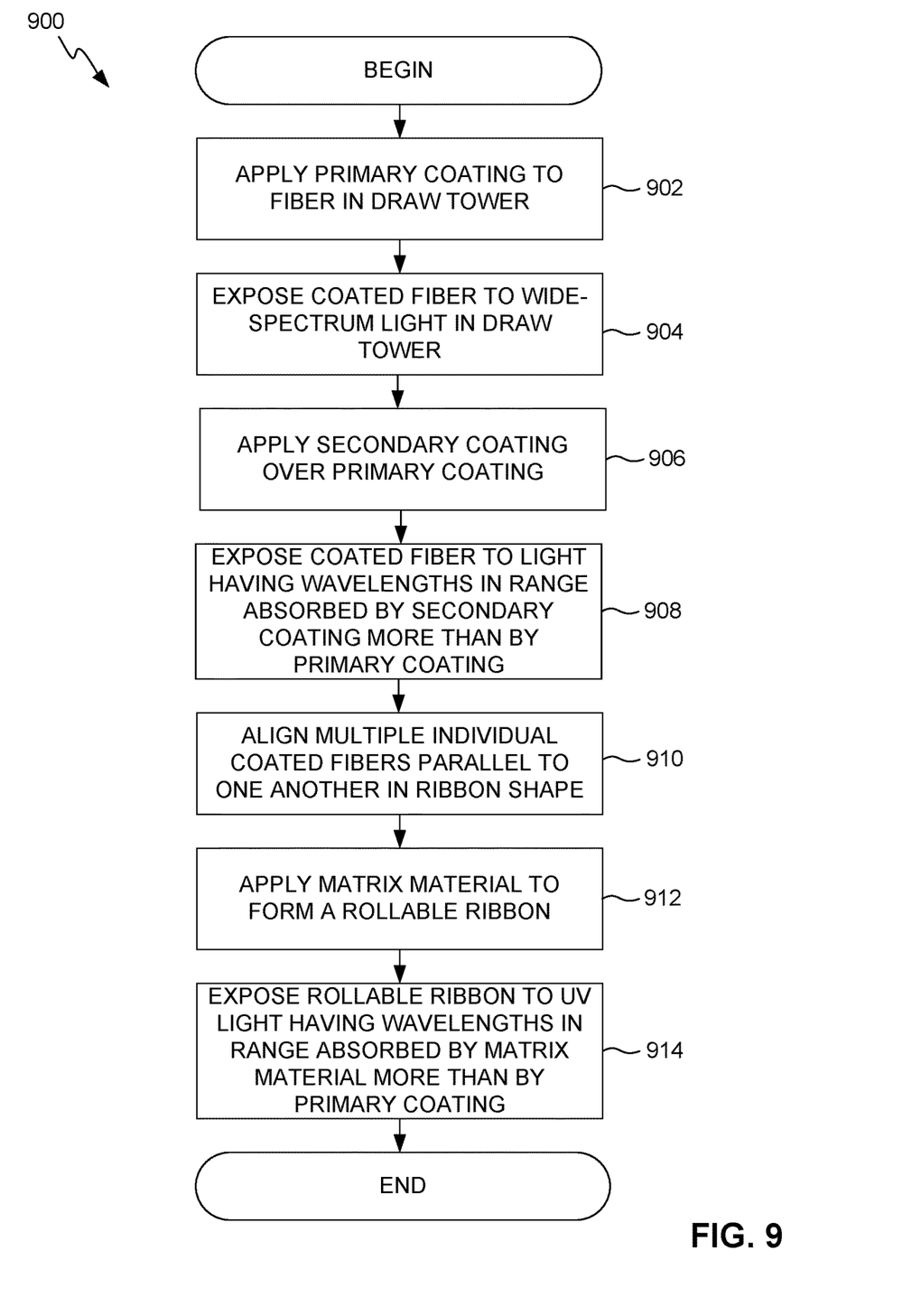
FIG. 9 is another flow diagram illustrating another method for making a rollable optical fiber ribbon, in accordance with exemplary embodiments.

A method 900 for making an optical fiber ribbon is illustrated in flow diagram form in FIG. 9. In accordance with method 900, not only the matrix material but also a secondary coating may be cured by exposing them to narrow-band UV light. Although the narrow-band UV light may also be absorbed more by the secondary coating than by the primary coating, there is no detrimental effect upon the secondary coating. As indicated by blocks 902 and 904, in a draw tower a primary coating is applied to a fiber, and the coated fiber is then exposed to wide-spectrum UV light. Alternatively, the primary coating could be exposed to narrow-band UV light in a range of wavelengths sufficiently absorbed by the primary coating to fully cure it.

As indicated by block 906, a secondary coating may be applied over the (cured) primary coating. As indicated by block 908, the fiber having the (cured) primary coating and (as yet uncured) secondary coating may then be exposed to narrow-band UV light concentrated in a range of wavelengths absorbed more by the secondary coating than by the primary coating. The light to which the fiber is exposed may be produced by, for example, a narrow-band UV curing unit having a UV LED with a wavelength range selected and provided in the manner described above with regard to FIGS. 6-7, or alternatively, having a UV bulb in combination with an optical bandpass filter with a wavelength range selected and provided in the manner described above with regard to FIG. 5.

Blocks 910, 912 and 914 of method 900 may be similar to blocks 802, 804 and 806, respectively, of above-described method 800 (FIG. 8). Each fiber of the plurality of fibers may be provided in the manner described above with regard to blocks 902-908. The plurality of fibers are then aligned with each other to form a ribbon-shaped fiber structure, as indicated by block 910. A matrix material is then applied to the ribbon shaped fiber structure, as indicated by block 912. The ribbon-shaped fiber structure and applied matrix material is then exposed to UV light concentrated in a range of wavelengths absorbed more by the matrix material than by the primary coating, as indicated by block 914. The light to which the fiber structure and applied matrix material are exposed may be produced by, for example, a narrow-band UV curing unit having a UV LED with a wavelength range selected and provided in the manner described above with regard to FIGS. 6-7, or alternatively, having a UV bulb in combination with an optical bandpass filter with a wavelength range selected and provided in the manner described above with regard to FIG. 5.

Figure 10:
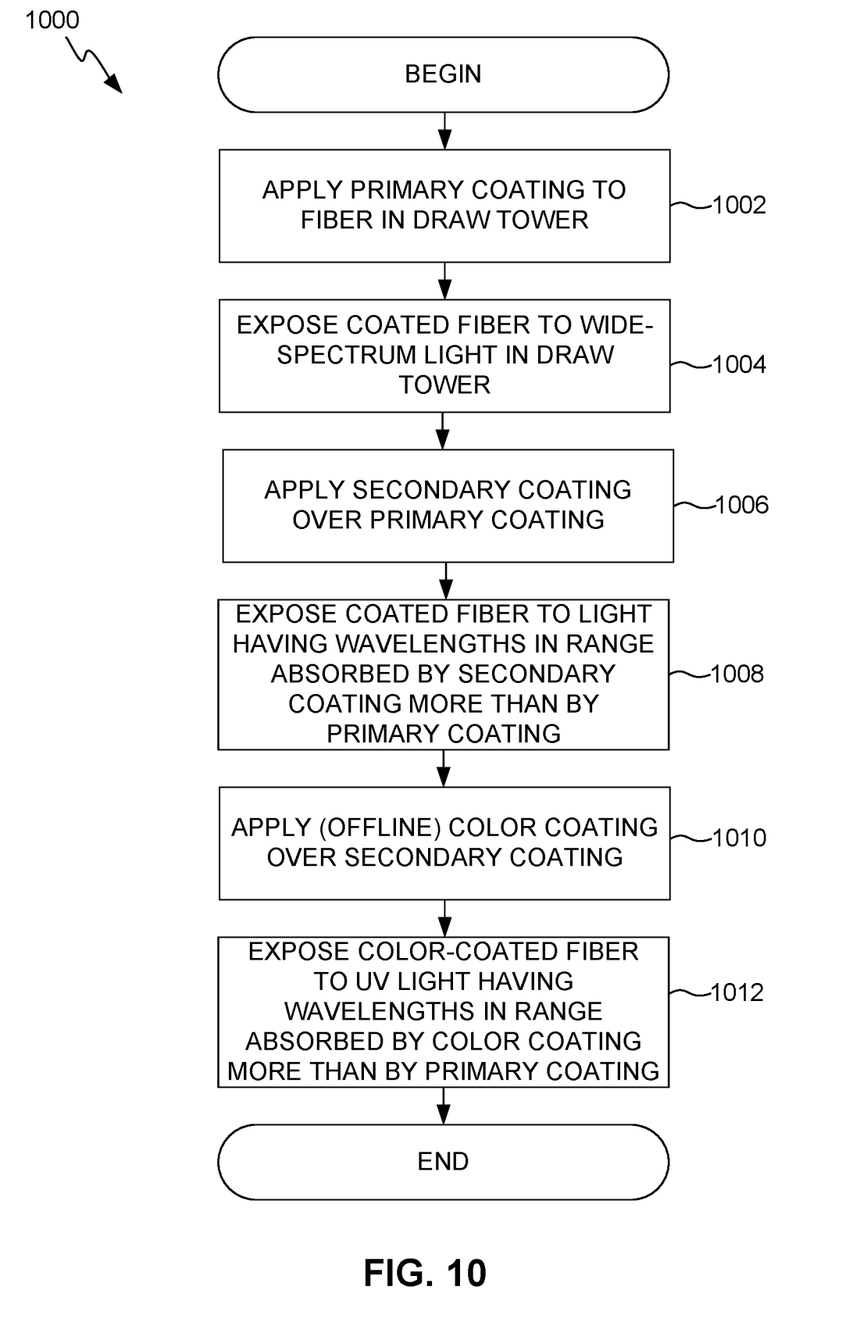
FIG. 10 is a flow diagram illustrating a method for making an optical fiber.

A method 1000 for making an optical fiber is illustrated in flow diagram form in FIG. 10. Blocks 1002, 1004, 1006 and 1008 are similar to blocks 902, 904, 906 and 908, respectively, in FIG. 9. As indicated by block 1010, the method 1000 further includes applying a color coating over the secondary coating in an offline (i.e., post-draw-tower) process. The color coating contains not only a dye or pigment but also a photoinitiator of the same types described above. As indicated by block 1012, the color coating may then be cured by exposing the coated fiber to UV light concentrated in a range of wavelengths absorbed much more by the color coating than by the primary coating. The light to which the coated fiber is exposed may be produced by, for example, a narrow-band UV curing unit having a UV LED with a wavelength range selected and provided in the manner described above with regard to FIGS. 6-7, or alternatively, having a UV bulb in combination with an optical bandpass filter with a wavelength range selected and provided in the manner described above with regard to FIG. 5. It should be noted that a method comprising blocks 1010 and 1012 may be applied to a conventionally produced dual-coated fiber. It should also be noted that a fiber produced in accordance with the method 1000 may be used in the above-described method 800 (FIG. 8) to produce a rollable ribbon.

One or more illustrative or exemplary embodiments of the invention have been described above. However, it is to be understood that the invention is defined by the appended claims and is not limited to the specific embodiments described.

What is claimed is:

1. A method for making an optical fiber ribbon, comprising:
   aligning a plurality of optical fibers parallel to and adjacent each other to form a ribbon-shaped group of fibers, each optical fiber having an ultraviolet (UV)-curable primary coating;
   applying a UV-curable matrix material in intermittently distributed portions between and in contact with each pair of adjacent fibers along the ribbon-shaped group of fibers; and
   exposing the ribbon-shaped group of fibers and applied matrix material to ultraviolet (UV) light concentrated in a second range of wavelengths absorbed more by the matrix material than by the primary coating and not concentrated in a first range of wavelengths absorbed more by the primary coating than by the matrix material.

2. The method of claim 1, wherein exposing the ribbon-shaped group of fibers and applied matrix material to UV light comprises exposing the ribbon-shaped group of fibers and applied matrix material to UV light emitted by a light-emitting diode (LED).

3. The method of claim 2, wherein exposing the ribbon-shaped group of fibers and applied matrix material to UV light comprises exposing the ribbon-shaped group of fibers and applied matrix material to UV light emitted by an LED and through a focusing lens.

4. The method of claim 3, wherein exposing the ribbon-shaped group of fibers and applied matrix material to UV light comprises exposing the ribbon-shaped group of fibers and applied matrix material to UV light emitted by an LED and reflected by a reflector.

5. The method of claim 1, wherein exposing the ribbon-shaped group of fibers and applied matrix material to UV light comprises exposing the ribbon-shaped group of fibers and applied matrix material to UV light emitted by a bulb through a bandpass filter, wherein the bandpass filter has a passband centered on a wavelength at which the matrix material exhibits a maximum UV absorbance and at which the primary coating exhibits a substantially lower UV absorbance than a maximum UV absorbance of the primary coating.

6. The method of claim 5, wherein the bandpass filter is tubular and surrounds the ribbon-shaped group of fibers and applied matrix material, and exposing the ribbon-shaped group of fibers and applied matrix material to UV light comprises the UV light passing through the tubular bandpass filter.

7. The method of claim 1, further comprising, before the step of aligning the plurality of optical fibers:
applying a UV-curable secondary coating over the primary coating of each optical fiber; and
exposing each optical fiber and applied secondary coating to UV light concentrated in a range of wavelengths absorbed more by the secondary coating than by the primary coating and not in a range of wavelengths absorbed more by the primary coating than by the secondary coating.

8. The method of claim 7, wherein exposing each optical fiber and applied secondary coating to UV light comprises exposing each optical fiber and applied secondary coating to UV light emitted by a light-emitting diode (LED).

9. The method of claim 8, wherein exposing each optical fiber and applied secondary coating to UV light comprises exposing each optical fiber and applied secondary coating to UV light emitted by an LED and through a focusing lens.

10. The method of claim 9, wherein exposing each optical fiber and applied secondary coating to UV light comprises exposing each optical fiber and applied secondary coating to UV light emitted by an LED and reflected by a reflector.

11. The method of claim 7, wherein exposing each optical fiber and applied secondary coating to UV light comprises exposing each optical fiber and applied secondary coating to UV light emitted by a bulb through a bandpass filter, wherein the bandpass filter has a passband centered on a wavelength at which the matrix material exhibits a maximum UV absorbance and at which the primary coating exhibits a substantially lower UV absorbance than a maximum UV absorbance of the primary coating.

12. The method of claim 11, wherein the bandpass filter is tubular and surrounds the optical fiber and applied matrix material, and exposing the optical fiber to UV light comprises the UV light passing through the tubular bandpass filter.

13. A system for making an optical fiber ribbon, comprising:
a fiber aligner configured to align a plurality of optical fibers parallel to and adjacent each other to form a ribbon-shaped group of fibers, each optical fiber having an ultraviolet (UV)-curable primary coating;
a matrix applicator configured to apply a UV-curable matrix material in intermittently distributed portions between and in contact with each pair of adjacent fibers along the ribbon-shaped group of fibers;
a tube configured to enclose the ribbon-shaped group of fibers and applied matrix material; and
a narrow-band UV light source oriented toward the tube enclosing the ribbon-shaped group of fibers and applied matrix material, the narrow-band UV light source configured to emit UV light concentrated in a second range of wavelengths absorbed more by the matrix material than by the primary coating and not in a first range of wavelengths absorbed more by the primary coating than by the matrix material.

14. The system of claim 13, wherein the narrow-band UV light source comprises a UV light-emitting diode (LED) configured to emit the UV light concentrated in the second range of wavelengths and not in the first range of wavelengths.

15. The system of claim 14, further comprising a reflector, wherein the tube is located between the LED and the reflector.

16. The system of claim 14, further comprising a focusing lens between the LED and the tube.

17. The system of claim 13, wherein the narrow-band UV light source comprises:
a UV bulb configured to emit UV light in both the first range of wavelengths and the second range of wavelengths; and
a tubular bandpass filter concentrically enclosing the tube, the tubular bandpass filter having a passband extending over the second range of wavelengths and not over the first range of wavelengths.

18. The system of claim 17, further comprising:
a first curved reflector system; and
a second curved reflector system, wherein the UV bulb, the tube, and the tubular bandpass filter are located between a concave reflective side of the first curved reflector system and a concave reflective side of the second curved reflector system.

* * * * *